United States Patent [19]

Roest et al.

[11] 3,911,054
[45] Oct. 7, 1975

[54] PROCESS FOR LOWERING THE VISCOSITY OF A SOLUTION OF A LIVING POLYMER

[75] Inventors: Bernard C. Roest, Geleen; Emanuel M. J. Pijpers, Elsloo, both of Netherlands

[73] Assignee: Stamicarbon N.V., Geleen, Netherlands

[22] Filed: Sept. 28, 1972

[21] Appl. No.: 293,055

[30] Foreign Application Priority Data
Oct. 1, 1971  Netherlands................. 7113482

[52] U.S. Cl............ 260/880 B; 260/80.7; 260/83.1; 260/83.5; 260/84.7; 260/85.3 R; 260/85.5 ES; 260/85.5 HC; 260/86.7; 260/88.1 PC; 260/88.2 C; 260/94.6; 260/878 R; 260/878 B; 260/879; 260/880 R
[51] Int. Cl.²................... C08L 9/00; C08L 47/00
[58] Field of Search............ 260/880 B, 84.7, 94.6, 260/879, 94.7 N, 880 B, 88.1, 879, 880 R, 847, 85.5 HC, 80.7, 94.6, 83.1, 80.7

[56] References Cited
UNITED STATES PATENTS

| 3,251,905 | 5/1966 | Zelinski | 260/880 |
|---|---|---|---|
| 3,301,840 | 1/1967 | Zelinski | 260/94.6 |
| 3,451,988 | 6/1969 | Langer | 260/84.7 |
| 3,536,679 | 10/1970 | Langer | 260/84.7 |
| 3,678,121 | 7/1972 | McElroy | 260/94.6 |
| R27,145 | 6/1971 | Jones | 260/880 |

FOREIGN PATENTS OR APPLICATIONS
677,680  12/1967  South Africa............. 260/94.7

*Primary Examiner*—Joseph L. Schofer
*Assistant Examiner*—Herbert J. Lilling
*Attorney, Agent, or Firm*—Cushman, Darby & Cushman

[57] ABSTRACT

Polyfunctional Lewis bases such as N,N,N',N'-tetramethyl-1,2-diaminoethane are used to lower the viscosity of a solution of a living polymer, especially during the preparation of a living polymer using a polyfunctional anionic initiator according to the process disclosed. Homopolymers and copolymers may be produced; the process is particularly suited for the preparation of A-B-A block copolymers the Lewis base being added after at least 50 percent of the first-formed polymer block is completed.

6 Claims, 1 Drawing Figure

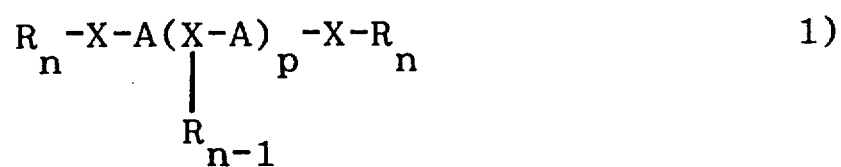
1)
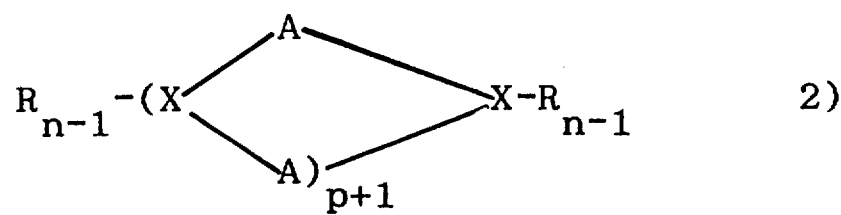
2)

PROCESS FOR LOWERING THE VISCOSITY OF A SOLUTION OF A LIVING POLYMER

BACKGROUND OF THE INVENTION

The invention relates to a process for lowering the viscosity of a solution of a living polymer, obtained by polymerization of one or several anionically polymerizable monomers in an inert organic solvent by means of a polyfunctional anionic initiator.

By "living polymer" is meant a polymer chain obtained by anionic polymerization which is still capable of adding anionically polymerizable monomer molecules (See Szware and Cran: Carbon Ions Living Polymers and Electron Transfer Process, Chapter I, page 6).

It has long been known that a considerable number of monomers can be polymerized by means of anionic initiators and examples of these anionically polymerizable monomers are i.a. conjugated dienes, such as butadiene and isoprene, monoalkenyl/aromatic compounds like styrene and $\alpha$-methylstyrene and derivatives of acrylic acid and methacrylic acid like acrylonitrile and methylmethacrylate. Not only can these monomers be made into valuable homopolymers, they also provide a suitable starting material for production of copolymers and block copolymers by means of anionic initiators. Examples of such products are i.a. random copolymers of styrene and butadiene and block copolymers containing at least one polymer block of styrene and/or $\alpha$-methyl styrene and a polymer block of butadiene or isoprene.

A special class of block copolymers that can be prepared by means of anionic initiators are the block copolymers with the general formula A-B-A, where A is a non-elastomeric polymer block and B is an elastomeric polymer block. If the molecular weights of the non-elastomeric polymer blocks are chosen between 200 and 50,000 and those of the elastomeric polymer blocks between 20,000 and 500,000, such block copolymers will possess elastomeric properties even in the nonvulcanized state. On this point they differ from other synthetic elastomers, which are useful as elastomers, only after being vulcanized. Block copolymers that are elastomeric in the non-vulcanized state can be processed to molded articles by means of techniques normally employed with thermoplastic polymers, such as injection molding and extrusion. Due to this desirable combination of properties and processing possibilities, these block copolymers are of special importance.

In the preparation of polymers from anionically polymerizable monomers both monofunctional and polyfunctional anionic initiators can be employed. However, both have their respective disadvantages.

A disadvantage attending the use of monofunctional anionic initiators is that relatively long polymerization times are needed for preparing a polymer of the desired molecular weight. Further, polymerization by means of monofunctional initiators is highly susceptible deactivation of the initiator caused by small amounts of deactivating impurities in the monomers to be polymerized. In the case of block copolymerization, notably in the polymerization to block copolymers having the general formula A-B-A, there is the added drawback that, in view of the demands imposed by selection rules, certain combinations of monomers cannot be employed. For example, it is not possible using a monofunctional initiator to prepare block copolymers consisting of poly(methylmethacrylate)-polyisoprene-poly(methylmethacrylate). As a consequence, several valuable products cannot presently be made.

If a polyfunctional anionic initiator is used in the polymerization of anionically polymerizable monomers, the above disadvantages of a monofunctional anionic initiator are largely eliminated; the reaction times needed for preparing a polymer with the desired molecular weight are considerably shorter than when a monofunctional initiator is used, the polymerization reaction is less susceptible to impurities in the monomers to be polymerized, while additionally block copolymers can be prepared which could not be made with monofunctional initiators. However, with the use of polyfunctional initiators there is a serious practical drawback. It has appeared that when polyfunctional initiators are employed, dipole-dipole interaction causes the viscosity of the polymerization reaction mixture to increase very sharply during the course of the polymerization. Increased viscosity is to be avoided in the preparation of A-B-A block copolymers. As a result the polymerization has to be carried out in economically unattractive quantities of solvent that are needed to lower the viscosity of the reaction mixture.

If the polymerization is carried out in normal solvent volumes, for example in 3 to 9 ml per gram of ultimate polymer, a very high stirring energy is needed, and as often happens the polymer will deposit in gel from on the stirring mechanism in the course of the polymerization. When this occurs it is no longer possible to drain the solution of the resulting living polymer from the reactor in the normal manner, with the consequence that the deactivation of the polymer must be carried out inside in the polymerization reactor itself. This deactivation considerably lowers the viscosity, but, on the other hand, as the polymerizations are usually carried out in a batch rather than a continuous process has the drawback that the next polymerization run cannot be started before the polymerization reactor has been fully conditioned and cleared of deactivator. In the case of anionic polymerization complete initiator clearing is especially difficult to realize in practice, because the amounts of initiator used are extremely small.

In the preparation of A-B-A block copolymers a high viscosity of the polymerization medium has the disadvantage that the monomer or monomer mixture that is added to form polymer blocks A after the polymerization of the monomer or monomers forming the elastomeric polymer block B has been completed, can no longer be intensively mixed with the solution of elastomeric polymer block B that has already been formed. As a result, the polymer formed in this way consists to a large part of the elastomeric polymer block B not linked to non-elastomeric polymer blocks A. Good physical and mechanical properties are thus destroyed to such a degree that the resulting polymer cannot be, in most cases, successfully used as an elastomer without vulcanization prior to use.

Surprisingly, it has now been found that the viscosity of a living polymer solution obtained by polymerization of anionically polymerizable monomers in an inert organic solvent by means of a polyfunctional anionic initiator can be strongly reduced without this causing deactivation of the living polymer according to the present invention.

DETAILED DESCRIPTION OF THE INVENTION

The process according to the present invention for lowering the viscosity of a solution of a living polymer obtained by polymerization of one or several anionically polymerizable monomers in an inert organic solvent by means of a polyfunctional anionic initiator is characterized in that a polyfunctional Lewis base capable of forming a chelate with the metal ion of the anionic initiator used is added to the polymer solution prior to deactivation in an amount of 0.01 to 100 times the molar quantity of anionic initiator used in the polymerization.

It has appeared that the presence of a polyfunctional Lewis base that is capable of forming a chelate with the metal ion of the anionic initiator used in solutions of a living polymer has a very pronounced reducing effect on the viscosity of the reaction mixture without causing deactivation of the polymer solution. This has made it possible to prepare polymers in normal solvent concentrations by means of polyfunctional anionic initiators, without encountering difficulties owing to unduly high viscosities are previously described. Furthermore, the process according to the present invention permits successful application of polyfunctional anionic initiators in the preparation of block copolymers and, notably, of block copolymers with the general formula A-B-A that possess good physical and mechanical properties.

It is noted that the U.S. Pat. No. 3,536,679 in the name of Langer, the disclosure of which is hereby incorporated by reference, discloses that anionically polymerizable monomers can be polymerized with a monolithinated amine, characterized as previously prepared complexes of monofunctional anionic initiators and chelate forming polyfunctional Lewis bases: the complexes are first subject to an aging process. It is to be noted that a possible decrease of the viscosity is not described or suggested in the Langer patent. Further, according to the present invention the initiator need not be premixed or aged with the Lewis base compound; the two components are introduced directly into the polymerization zone, either separately or together.

Polyfunctional Lewis bases employed according to the present invention are Lewis bases capable of forming a chelate with the metal ion of the anionic initiator employed. As will be appreciated by one skilled in the art there are a number of such compounds that may be used and a preliminary investigation thereof will indicate those compounds most suitable. These compounds preferably have a functionality equal to two or greater. According to the present invention preferred compounds have the general formula:

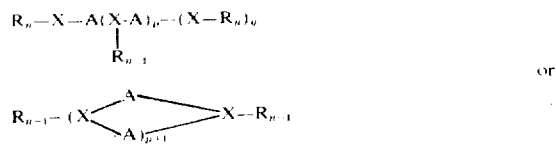

where, in each of the above general formulas, X is independently nitrogen, phosphorous, oxygen or sulfur; A is characterized as a non-reactive hydrocarbon group having from 1–12 carbon atoms, and more specifically A is a radical which is (1) a cycloaliphatic radical or a cycloaliphatic radical containing lower alkyl group of 1–4 carbon atoms which radicals have ring structures of 4 to 7 members and are attached to the nitrogen atoms at 1,2 or 1,3 positions on the rings; or (2) a radical consisting of 1 to 20 methylenic groups wherein each methylenic group may contain 0 to 2 monovalent hydrocarbon radicals of 1 to 6 carbon atoms such as monovalent hydrocarbon radicals including methyl, ethyl, propyl, pentyl, hexyl, and the like are suitable; and each R is independently alkyl, aryl, alkaryl, aralkyl or alkylidene group each having from 1–12 carbon atoms; n is 1 or 2, p is 0, 1 or 2 and y is 1 to 4.

In one preferred embodiment of the present invention the A substituent contains from 1–6 carbon atoms and the R substituents each range from 1–8 carbon atoms.

It is further preferred to use these compounds in which X is a nitrogen atom and p equals 0 or 1, and A has from 2–5 carbon atoms. Particularly suited compounds of this type are those in which at least one of the R groups is a methyl group. Of these compounds chelates formed with the metal ion of the anionic initiator possess the highest stability hence are more desirable.

Illustrative Lewis bases according to the present invention are:

2,2'-bipyridine, 1,2-dimethoxyethane, acetone dimethylacetal,
N,N'-dimethyl N,N'-diethyl-1,2-diaminoethane,
N,N,N',N'',N''-hexamethyl-1,3,5-triaminocyclohexane,
N,N,N'N'-tetramethyl-1-cyclohexyl-1,2-diaminoethane,
N,N,N'N'-tetramethyl-1,2-diaminopentane,
N,N,N'N'-tetramethyl-1,3-diaminopentane,
N,N,N',N'-tetramethyl-1,2-diaminopropane,
N,N,N',N'-tetramethyl-1,2-diaminobutane,
N,N,N',N'-tetramethyldiaminomethane,
N,N,N',N'-tetramethyl-1,2-diaminocyclohexane.

An especially preferred bifunctional Lewis base is N,N,N'N'-tetramethyl-1,2-diaminoethane (TMEDA).

The Lewis bases to be used according to the present invention can be employed in amounts of 0.01–100 mmoles per mmole of the anionic initiator used for the polymerization. It is preferred, however, to use an amount of between 0.1 and 10 mmoles per mmole of initiator. The amount of initiator used is from 0.001 to 1 mmole per gram of the ultimate polymer produced. The initiator is contacted with the monomer for 5 minutes to 10 hours, preferably from 15 to 90 minutes.

The polymer solutions to which the polyfunctional Lewis bases according to the present invention may be added may be living-polymer solutions of homopolymers, copolymers or block copolymers of anionically polymerizable monomers. Examples of anionically polymerizable monomers are i.a. conjugated dienes with 4 to 18, in particular 4 to 8 carbon atoms, such as butadiene, isoprene, 1,3-pentadiene, 1,3-octadiene, 1,3-heptadiene, 1,3-hexadiene and 2-methyl-1,3-butadiene; monoalkenylaromatic compounds with 8–18 carbon atoms, in particular 8–12 carbon atoms per molecule, such as styrene, α-methylstyrene, 3-ethylstyrene, 4-propylstyrene and the like, and 1-alkylethene carboxylic esters derived from a 1-alkylethene carboxylic acid with an alkyl group having from 1–4 carbon atoms and a monovalent alcohol having from 1 to 10 carbon atoms per molecule, such as i.a. methylmethacrylate, ethylacrylate, ethylmethacrylate and, furthermore, compounds like acrylonitrile, methacrylonitrile and pivalolactone. The preferred monomers are isoprene, butadiene, acrylonitrile, methylmethacrylate and styrene. As indicated the monomers may be polymerized singly to form homopolymers or polymerized in mixtures to form copolymers, random copolymers or block copolymers.

When polymerizing one or more conjugated dienes in the preparation of homo- or copolymers it is preferred to introduce the Lewis base in the latest stage of the polymerization process, preferably when more than 50 percent and in particular more than 75 percent of the conjugated diene has been transformed into a polymer. This is because it has been found that the Lewis bases when present during the polymerization of conjugated dienes reduce the cis-1,4 content of the ultimate polymer, and thus have an unfavorable effect on the physical and mechanical properties.

In the preparation of a block copolymer having the general formula A-B-A, where B is an elastomeric polymer block and A is a non-elastomeric polymer block, prepared by first polymerizing a monomer or monomer mixture to form the elastomeric polymer block B and subsequently polymerizing a monomer or monomer mixture to the non-elastomeric polymer blocks A, by means of a polyfunctional anionic initiator, it is preferred for best results to introduce the Lewis base when at least 50 percent or more and especially when more than 75 percent of the monomers constituting the elastomeric polymer block B has been polymerized. It is further preferred in that case to add the Lewis base before 25 percent and particularly 10 percent of the monomers constituting the non-elastomeric polymer blocks A have been polymerized. The molecular weight of the A and B blocks will vary depending on the monomer and the reaction condition. Typically the A blocks are of a number average molecular weight of 2,000 to 50,000 and the B blocks having a number average molecular weight of 20,000 to 250,000.

If in the preparation of the above described A-B-A block copolymers all the necessary monomers are brought into the reaction chamber before the polymerization is commenced it is preferred not to add the Lewis base until 75 percent of the monomers constituting the elastomeric polymer block B have been polymerized. This provides for proper mixing of the monomers to form the non-elastomeric polymer blocks A with the elastomeric polymer block B already formed.

The preparation of solutions of living polymers may be started from any polyfunctional anionic initiator. As already indicated polyfunctional anionic initiators are well known in the art. Examples of suitable polyfunctional anionic initiators are i.a. dilithium methane, 1,4-dilithium butane, 1,10-dilithium decane, 1,4-dilithium cyclohexane, 1,4-dilithium butene, 1,5-dilithium naphthalene and 1,2,5-trilithium naphthalene. Very good results are obtained with a polyfunctional anionic initiator as described in U.S. Patent Application Ser. No. 268,172 filed June 30, 1972, the disclosure of which is hereby incorporated by reference. Polyfunctional anionic initiators containing other metal ions, like sodium, potassium and magnesium, may also be used.

Suitable organic solvents are those which are inert to the anionic initiator employed as well as the polymerization reaction as it proceeds. Examples of applicable organic solvents are inert saturated aliphatic or cycloaliphatic hydrocarbons having from 2–20 carbon atoms or from aromatic hydrocarbons having 6–20 carbon atoms or mixture thereof; such inert solvents are illustrated by hexane, heptane, cyclohexane, benzene and toluene. Mixtures of suitable solvents such as mixture of polar solvents like gasoline, and mixtures of a polar and non-polar solvent, may also be used. Polar solvents such as tetrahydrofuran are also satisfactory. The concentration of the monomer in the solvent or diluent may vary from 1 to 100 weight percent, and preferably from 10 to 50 weight percent. The quantity of solvent, however is appreciably less than prior art procedures. The polymerization reaction is carried out in the range of about $-60°$ to $+100°C$, preferaably $-40°$ to $+80°C$, and at a pressure of about 0.1 to 25 atm, preferably 1 to 8 atm; however higher and lower pressures may be used. Preferably the reaction is conducted in oxygen-free surroundings and the reactants as well as the reaction vessels are substantially or completely free from water.

The following examples will further illustrate the present invention in a nonlimiting manner. Unless otherwise indicated all parts and percentages are by weight.

EXAMPLE 1

Cyclohexane (295 ml), styrene (20 ml) and isoprene (50 ml) were combined in a glass reaction vessel fitted with a stirrer and a cooler. Prior to use the reaction vessel and all the reagents were carefully dried and freed of oxygen. Next, the temperature of reaction vessel was adjusted to 60°C and 0.5 mmole of an anionic initiator with a functionality equal to 2.7 (prepared in conformity with the U.S. Pat. application Ser. No. 268,172 filed June 30, 1972, by reacting secondary butyllithium subsequently with styrene, divinyl benzene and styrene), was introduced into the reactor to start the polymerization. The temperature during polymerization was kept at 60 °C by cooling.

Agitating during this experiment was done with a stirrer mechanism whose rotational speed is automatically maintained constant even if the stirrer meets with increasing resistance. This is accomplished using an eddy-current clutch. The stirrer machinism is connected to an ammeter and the amperage indication is a measure of the viscosity of the reaction mixture. During the block copolymerization the milliamperage needed for the stirrer mechanism rotating at 183 rpm varied as follows:

| | |
|---|---|
| before addition of initiator to monomers | 45.5 mA |
| 4 minutes after addition of initiator | 47 mA |
| 7 minutes | 53 mA |
| 11 minutes | 62 mA |
| 35 minutes | 72 mA |
| 2 hours | 77 mA |

Thus as the reaction mixture thickens the current required increases. Two hours after the start of the polymerization 0.1 ml of N,N,N',N'-tetramethyl-1,2-diaminoethane was added to the non-deactivated polymer solution. As a result the amperage needed for the stirrer mechanism very rapidly fell off to 47 mA indicating the affect on viscosity of diaminoethane compound added. Addition of another 0.1 ml of this compound to the non-deactivated polymer solution caused a further decrease to 45 mA.

Further addition of N,N,N',N'-tetramethyl-1,2-diaminoethane did not lead to lower amperages. The nondeactivated polymer solution was then poured into 1000 ml of acetone containing 0.5 g of a dissolved antioxidant known under the trademark Plastonox 2246, and dried. The resulting A-B-A-block copolymer composed of styrene and isoprene blocks had a tensile strength of 180 kg/cm², a permanet set of 12 percent and a melt index equalling 4.4. The yield of block copolymer was 52 g.

EXAMPLE 2

Cyclohexane (800 ml) and styrene (28 ml) were brought together in a 1-liter glass reaction vessel. To destroy all impurities that are harmful to the initiator, the mixture was titrated with secondary butyl lithium until a light color was observed (about 0.1 mmole). Thereafter ferric diisopropyl salicylate (22 mg) was added and dried butadiene passed through the reaction liquid until the mixture was saturated at 60°C. Next, a polyfunctional anionic initiator prepared by reacting secondary butyllithium with subsequently styrene, divinyl benzene and styrene, prepared by the method described in the U.S. Pat. application Ser. No. 268,172, filed June 30, 1972 with an average functionality equal to 3 (0.15 mmole) was added. This started the polymerization reaction. During the polymerization while the temperature was maintained at 60 °C, butadiene (80 g) was introduced. Using a stirrer identical to that of example 1 the motor speed was kept at 183 rpm, the amperage increased continuously from 50 mA to 97 mA over a period of 120 minutes. After the polymerization has been going for 120 minutes, N,N',N'-tetramethyl-1,2-diaminoethane (0.2 ml) was added resulting in a drop in amperage to 65 mA.

The resulting random copolymer of butadiene and styrene was processed in the manner described in example 1, 105 g of polymer were obtained.

EXAMPLE 3

Example 1 was repeated the only difference being that the run was started from a mixture of the same respective amounts of cyclohexane and isoprene rather than styrene. Upon addition of a polyfunctional anionic initiator with an average polyfunctionality of 2.1 prepared by reacting secondary butyllithium with subsequently styrene, divinyl benzene and styrene (0.5 mmole), at 60 °C, the mixture was polymerized for 60 minutes. During this polymerization the amperage of the stirrer motor rose from 45 to 68 mA.

Subsequent addition of 0.1 ml of N,N,N',N'-tetramethyl-1,2-diaminoethane (TMEDA) caused a rapid decrease in amperage to 47 mA. After that styrene (20 ml) was introduced and the polymerization was continued at 60 °C for 45 minutes. The amperage needed for the stirrer mechanism during this polymerization went up from 47 to 49 mA. The polystyrenepolyisoprene-polystyrene block copolymer thus prepared was processed in the manner of example 1. The yield was 51 g of block copolymer of the following properties: tensile strength 196 kg/cm², permanent set: 8 percent; melt index: 3.7.

EXAMPLE 4

Example 3 was repeated the only difference being that the starting mixture consisted of isoprene (50 ml) and cyclohexane (150 ml). This mixture was heated to 60°C, whereupon an initiator with an average functionality of 2.7 prepared by reacting of secondary butyllithium with subsequently styrene, divinyl benzene and styrene (0.5 mmole) was introduced. During this polymerization the amperage of the stirrer mechanism increased from the initial value of 46 mA to 110 mA, whereupon the polymer formed deposited as a thick slurry on the stirrer mechanism, and the required amperage decreased.

After 60 minutes polymerization, TMEDA (0.2 mmole) was added, whereupon the polymer detached from the stirrer mechanism and the solution could be easily stirred. The amperage needed for stirring this solution was 68 mA. Subsequently styrene (20 ml) was added and polymerization was continued for 45 minutes. The amperage of the stirrer mechanism then increased from 68 to 72 mA. The resulting block copolymer was poured into acetone and processed. This yielded 52 g of polymer with a tensile strength of 170 kg/cm², a permanent set of 14 percent and a melt index of 4.1.

EXAMPLE 5

In a glass reaction vessel of the type described in example 1 and provided with a stirrer mechanism identical thereto cyclohexane (900 ml) and isoprene (150 ml) were brought together and heated to 40°C. Next an anionic initiator with an average functionality of 2.4 prepared by reacting of secundary butyllithium with subsequently styrene, divinyl benzene and styrene (0.4 mmole) was added, caused the polymerization to start. The polymerization was continued for 30 minutes. The amperage needed for the stirrer mechanism rose continuously from 47 to 85 mA.

After that, TMEDA (0.1 mmole) was added, with the result that the amperage fell off to 52 mA and the solution became thinly liquid again. Polymerization was continued for another 10 minutes, whereupon the resulting polymer solution was poured into 1000 ml of acetone and processed in the same way as described in example 1. 96 g of polymer were obtained.

What is claimed is:

1. A process for lowering the viscosity of a solution of a living polymer produced by polymerizing at least one conjugated diene monomer of 4–18 carbon atoms and then copolymerizing said diene with an anionically polymerizable monomer selected from the group consisting of methyl methacrylate, acrylonitrile, styrene, α-methylstyrene and mixtures thereof; which comprises reacting at least one conjugated diene monomer at a temperature of about +40° to +80° C in an organic solvent in the presence of 0.05 to 10 mmole of a lithium-containing polyfunctional anionic initiator per liter of the solvent for said diene monomer, and thereafter, after at least 50 weight percent of said diene monomer has been polymerized, consisting of adding in the latest stage of the polymerization process the Lewis base N,N,N',N'-tetramethyl-1, 2-diaminoethane(TMEDA) in the amount of from about 0.01 to 100 times the amount of said polyfunctional anionic initiator thereby forming a chelate with the lithium polyfunctional anionic initiator.

2. The process according to claim 1 wherein the Lewis base is used in an amount from about 0.1–10 times the molar quantity of the anionic polymerization initiator.

3. The process according to claim 1 wherein the Lewis base is added in the latest stage of the polymerization process after at least about 75 weight percent of said monomer is polymerized.

4. In a process for the preparation of a block copolymer having good physical and mechanical properties of the general configuration

A-B-A in the presence of a polylithium anionic polymerization initiator comprising the sequential polymerization steps of:
1. polymerizing at least one monomer to form polymer block B consisting of an elastomeric homopolymer having a glass transition temperature below −10°C and a number average molecular weight between 20,000 and 250,000;
2. adding at least one monomer to the reaction mixture containing said block B and continuing said polymerization and under such conditions to form polymer blocks A on said polymer block B, polymer blocks A selected from the group consisting of a non-elastomeric homopolymer having a glass transition temperature over 25°C and a number average molecular weight between 2,000 and 50,000 and a non-elastomeric copolymer having a glass transition temperature over 25°C and a number average molecular weight between 2,000 and 50,000 whereby said block copolymer A-B-A is formed.
the improvement consisting of adding the Lewis base N,N,N',N'-tetramethyl-1-2 diaminoethane (TMEDA) to the polymerization mixture of step (1) after at least about 50 weight percent of said polymer block B has been formed and before at least 10 weight percent of polymer blocks A are formed said TMEDA present in the amount of from about 0.01 to 100 times the amount of said polylithium anionic initiator, said Lewis base capable of forming a chelate with the lithium ion of the polylithium anionic polymerization initiator.

5. The process according to claim 4 wherein the Lewis base is used in an amount from about 0.01–10 times the molar quantity of the anionic polymerization initiator.

6. In a process for the preparation of a block copolymer having improved physical and mechanical properties of the general configuration

A-B-A in the presence of a polylithium anionic polymerization initiator comprising the sequential polymerization steps of:
1. polymerizing at least one monomer selected from the group consisting of butadiene and styrene to form elastomeric polymer block B having a number average molecular weight between 20,000 and 250,000;
2. adding styrene monomer to the reaction mixture containing said block B and continuing said polymerization and under such conditions to form polymer blocks A on said polymer block B, polymer blocks A having a number average molecular weight between 2,000 and 50,000 whereby said block copolymer A-B-A is formed,
the improvement consisting of adding to the Lewis base N,N,N',N'-tetramethyl-1,2 diaminoethane (TMEDA) to the polymerization mixture of step (1) after at least about 50 weight percent of said polymer block B has been formed and before at least 10 weight percent of polymer blocks A are formed, said TMEDA present in the amount of from about 0.01 to 100 times the amount of said polylithium anionic initiator, thereby forming a chelate with the lithium ion of the polylithium anionic polymerization initiator.

* * * * *